(12) United States Patent
Hirayama et al.

(10) Patent No.: US 6,679,345 B2
(45) Date of Patent: Jan. 20, 2004

(54) FUEL BATTERY MOUNTED MOTORCYCLE

(75) Inventors: Shuuji Hirayama, Saitama (JP);
Noboru Yamashita, Saitama (JP);
Mitsuru Iseno, Saitama (JP);
Masayuki Toriyama, Saitama (JP);
Masashi Igarashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 44 days.

(21) Appl. No.: 09/880,002

(22) Filed: Jun. 14, 2001

(65) Prior Publication Data

US 2002/0005305 A1 Jan. 17, 2002

(30) Foreign Application Priority Data

Jun. 14, 2000 (JP) ........................................ 2000-178621

(51) Int. Cl.[7] ................................................ B62M 7/00
(52) U.S. Cl. ..................... 180/65.3; 180/220; 320/104
(58) Field of Search .............................. 180/65.1, 65.3, 180/65.8, 68.4, 68.5, 220; 320/101, 103, 104, DIG. 34

(56) References Cited

U.S. PATENT DOCUMENTS

| | | | | |
|---|---|---|---|---|
| 4,721,178 A | * | 1/1988 | Ito ............................... | 180/215 |
| 4,842,091 A | * | 6/1989 | Badsey ........................ | 180/219 |
| 5,193,635 A | | 3/1993 | Mizuno et al. | |
| 5,207,288 A | * | 5/1993 | Ono ............................. | 180/220 |
| 5,421,427 A | * | 6/1995 | Ogawa et al. ............... | 180/220 |
| 5,577,747 A | * | 11/1996 | Ogawa et al. ............... | 180/220 |
| 5,613,569 A | * | 3/1997 | Sugioka et al. ............. | 180/68.5 |
| 5,641,031 A | * | 6/1997 | Riemer et al. ............... | 180/65.3 |
| 5,662,184 A | * | 9/1997 | Riemer et al. ............... | 180/65.1 |
| 5,765,671 A | * | 6/1998 | Endo et al. .................. | 192/48.2 |
| 5,837,393 A | * | 11/1998 | Okamoto ...................... | 429/20 |
| 5,848,660 A | * | 12/1998 | McGreen ..................... | 180/206 |
| 5,858,568 A | * | 1/1999 | Hsu et al. ..................... | 429/13 |
| 6,011,378 A | * | 1/2000 | Tabata et al. ................ | 318/759 |
| 6,107,691 A | * | 8/2000 | Gore et al. ................... | 290/1 R |
| 6,326,765 B1 | * | 12/2001 | Hughes et al. ............... | 320/104 |
| 6,328,121 B1 | * | 12/2001 | Woodbury et al. .......... | 180/65.1 |
| 6,378,637 B1 | * | 4/2002 | Ono et al. .................... | 180/65.3 |
| 6,568,496 B1 | * | 5/2003 | Huang ......................... | 180/220 |

FOREIGN PATENT DOCUMENTS

| | | |
|---|---|---|
| EP | 0677417 A1 | 10/1995 |
| JP | 3-109126 | 5/1991 |
| JP | 5260611 | 10/1993 |
| WO | WO 0115967 A1 | 3/2001 |

* cited by examiner

Primary Examiner—Brian L. Johnson
(74) Attorney, Agent, or Firm—Birch, Stewart, Kolasch & Birch, LLP

(57) ABSTRACT

A fuel battery mounted motorcycle has a lower center of gravity by disposing a reformer for generating hydrogen, together with a fuel battery and a secondary battery, in a lower portion of a floor of the motorcycle. The center of gravity of the motorcycle can be lowered and the floor can be effectively utilized for a purpose other than the original purpose of the floor.

7 Claims, 12 Drawing Sheets

COMPARATIVE ART

COMPARATIVE ART

COMPARATIVE ART

FUEL BATTERY MOUNTED MOTORCYCLE

BACKGROUND OF THE INVENTION

1. Field of the Invention

The present invention relates to a fuel battery mounted motorcycle, and in particular, to the arrangement of the various components associated with the fuel battery on the motorcycle.

2. Description of the Background Art

Fuel battery mounted motorcycles are known, for example, from Japanese Patent Laid-open No. Hei 3-109126 entitled "Fuel Battery Mounted Motorcycle". As shown in FIG. 1 of the above document, the above technique discloses an electric motorcar 1 using a fuel battery 13 as an energy source, wherein the fuel battery 13 is disposed in a lower central portion of a vehicular body 2 (note: reference numerals are cited from the document).

In the case of using the fuel battery 13 as an energy source, as will be described later, a motorcycle must be provided with, in addition to the fuel battery 13, a fuel tank for storing methanol, a reformer for generating hydrogen, a secondary battery for storing an electric power generated by the fuel battery 13, and the like. Further, in the case of mounting a fuel battery like the fuel battery 13 on a motorcycle, the layout of the fuel battery, reformer, secondary battery, and the like becomes important. The principle of power generation by a fuel battery and one example of a fuel battery system will be hereinafter described.

FIGS. 15($a$) and 15($b$) are diagrams illustrating the principle of power generation by a fuel battery, wherein FIG. 15($a$) shows the principle of electrolysis of water, and FIG. 15($b$) shows the principle of power generation by the fuel battery.

Referring to FIG. 15($a$), the electrolytic process of water ($H_2O$) is performed by filling a water tank 101 with water ($H_2O$) in which an electrolyte such as sulfuric acid ($H_2SO_4$) has been dissolved; setting electrodes 102 and 103, each of which is typically made from platinum, in the water tank 101; covering the electrodes 102 and 103 with containers 104 and 105, respectively; and applying a current, from a DC power source 106, between the electrodes 102 and 103, whereby oxygen gas ($O_2$) is generated on the electrode 102 side taken as the plus side and hydrogen gas ($H_2$) is generated on the electrode 103 side taken as the minus side. In the figure, an arrow ($e^-$) designates the flow of electrons and an arrow ($H^+$) designates the flow of hydrogen ions.

Referring to FIG. 15($b$), the power generation process is performed in accordance with steps reversed to those shown in FIG. 15($a$), that is, by filling the container 104 with oxygen gas ($O_2$) and the container 105 with hydrogen gas ($H_2$); connecting a load 107 between the electrodes 102 and 103; and making the oxygen gas ($O_2$) and hydrogen gas ($H_2$) electrochemically react with each other in water ($H_2O$) in which sulfuric acid ($H_2SO_4$) as an electrolyte has been dissolved, whereby a current flows in the load 107, and the oxygen gas ($O_2$) is bonded to the hydrogen gas ($H_2$) to produce water ($H_2O$).

As shown in FIG. 15($b$), the process of power generation of a fuel battery is reversed to the process of electrolysis of water shown in FIG. 15($a$). The fuel battery system will be described with reference to FIG. 16.

FIG. 16 is a block diagram showing one example of the fuel battery system. A fuel battery system 110 includes a fuel tank 111 for storing methanol; a reformer 112 for generating hydrogen from methanol and water; a fuel battery 113 for making hydrogen generated by the reformer 112 electrochemically react with oxygen in air; a first pump 115 for supplying outside air to the fuel battery 113 via an air cleaner 114; a second pump 116 for supplying hydrogen from the reformer 112 to the fuel battery 113; a catalyzer 117 for receiving water vapor from the fuel battery 113 and carbon dioxide gas from the reformer 112 via the fuel battery 113 and for reducing the amount of carbon dioxide gas; a water tank 118 for receiving water from the catalyzer 117; a secondary battery 119 for storing an electric power generated by the fuel battery 113; and a motor 122 connected to the secondary battery 119 via a control unit 121. In addition, the secondary battery 119 also functions to store an electric power generated by the motor 122.

In the figure, a hollow arrow ($CH_3OH$) designates the flow of methanol; a hollow arrow ($H_2$) is the flow of hydrogen gas; a hollow arrow ($O_2$) is the flow of oxygen gas; a hollow arrow ($H_2O+CO_2$) is the flow of water vapor and carbon dioxide gas; and a hollow arrow ($H_2O$) is the flow of water.

As described above, in the case of using the fuel battery 113 as an energy source of a motorcycle (not shown), it is required to provide, in addition to the fuel battery 113, the fuel tank 111 for storing methanol, the reformer 112 for generating hydrogen, the secondary battery 119 for storing an electric power generated by the fuel battery 113, and the like. In the case of actually mounting the fuel battery 113, fuel tank 111, reformer 112, and the like on a motorcycle, it is required to examine the layout of the fuel battery system 110 including the fuel battery 113, fuel tank 111, reformer 112, and the like from the viewpoint of various factors such as the weight balance, maintenance, and design.

SUMMARY OF THE INVENTION

It is therefore an object of the present invention to provide a technique of mounting a fuel battery on a motorcycle, which is capable of optimally arranging the fuel battery, a reformer, a secondary battery, and the like.

To achieve the above object, there is provided a fuel battery mounted motorcycle including a low level floor, characterized in that at least one of a fuel battery and a reformer for generating hydrogen is disposed in a lower portion of the floor. With this configuration, since at least one of the fuel battery and the reformer for generating hydrogen is disposed in a lower portion of the floor, it is possible to lower the center of gravity of the motorcycle.

The reformer for generating hydrogen may be disposed, together with the fuel battery, in a lower portion of the floor. With this configuration, since the reformer for generating hydrogen is disposed, together with the fuel battery, in the lower portion of the floor, it is possible to further lower the center of gravity of the motorcycle, and also to shorten pipes for connecting the fuel battery to the reformer.

A secondary battery may be disposed, together with the fuel battery, in a lower portion of the floor. With this configuration, since the secondary battery is disposed, together with the fuel battery, in the lower portion of the floor, it is possible to lower the center of gravity of the motorcycle.

The secondary battery may be located on the front side of the lower portion of the floor, and the fuel battery may be disposed on the rear side of the lower portion of the floor. With this configuration, since the secondary battery is located on the front side of the lower portion of the floor and the fuel battery is disposed on the rear side of the lower portion of the floor, it is possible to increase a load distributed on a front wheel and thereby keep the weight of the front wheel in balance against the weight of a rear wheel, and to improve the maintenance workability of the secondary battery.

The secondary battery and the fuel battery may be stacked in the vertical direction in the lower portion of the floor. With this configuration, it is possible to easily change the capacity of the secondary battery by disposing the secondary battery on the fuel battery, and to lower the center of gravity of the motorcycle by disposing the secondary battery under the fuel battery.

The reformer may be disposed, together with the fuel battery and the secondary battery, in the lower portion of the floor. With this configuration, since the reformer for generating hydrogen is disposed, together with the fuel battery and secondary battery, in the lower portion of the floor, it is possible to lower the center of gravity of the motorcycle, to centralize the system including the reformer, fuel battery, and secondary battery, and to shorten wires or pipes for electrically or fluidly connecting them to each other.

According to a further aspect of the invention, there is provided a fuel battery mounted motorcycle including a fuel battery, a secondary battery, a motor, and a belt-type automatic transmission, characterized in that the belt-type automatic transmission is disposed on one side with respect to a center plane of a vehicular body of the motorcycle, and the secondary battery is disposed on the other side with respect to the center plane of the vehicular body. With this configuration, since the belt type automatic transmission is disposed on one side with respect to a center plane of a vehicular body of the motorcycle, and the secondary battery is disposed on the other side with respect to the center plane of the vehicular body, it is possible to keep the weights on the right and left sides of the motorcycle in balance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
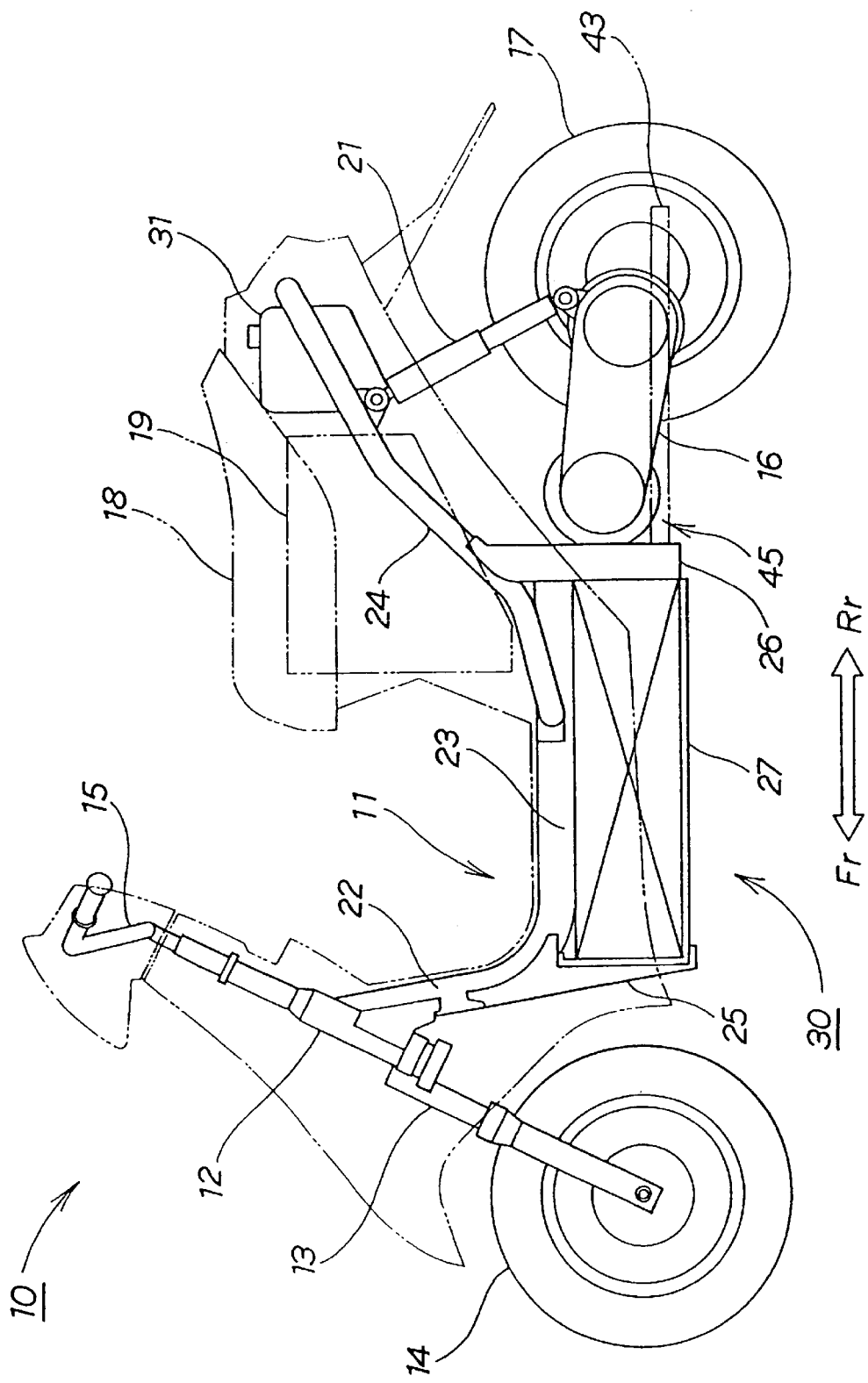
FIG. 1 is a side view of a first embodiment of a fuel battery mounted motorcycle of the present invention.

Hereinafter, embodiments of the present invention will be described with reference to the accompanying drawings. In the drawings, the "front", "rear", "left", "right", "upper", "lower" sides are based on the line of view of the driver riding on a motorcycle to which the present invention is applied, and characters "Fr", "Rr", "L", and "R" designate the front, rear, left, and right sides, respectively.

FIG. 1 is a side view of a first embodiment of a fuel battery mounted motorcycle according to the present invention. Referring to this figure, there is shown a fuel battery mounted motorcycle 10 (hereinafter, referred to simply as "motorcycle 10"), which is configured, according to this embodiment, as a scooter-type motorcycle including a low level floor. The motorcycle 10 mainly includes a front fork 13 mounted to a head pipe 12 of a body frame 11; a front wheel 14 mounted to the front fork 13; a handlebar 15 connected to the front fork 13; a swing unit 16 mounted to an upper rear portion of the body frame 11; a rear wheel 17 mounted to a rear portion of the swing unit 16; a seat 18 disposed on an upper rear portion of the body frame 11; a fuel battery system 30 with its main portion disposed under the body frame 11; and a power unit 45 driven by the fuel battery system 30. In the figure, reference numeral 19 designates a helmet box, and 21 is a rear suspension.

The body frame 11 includes a down tube 22 extending rearwardly from the head pipe 12, and a center tube 23 extending rearwardly from the down tube 22. A pair of right and left rear pipes 24 (only one is shown in the figure) extend from a mid point of the center tube 23. A front stay 25 extends downwardly from a mid point of the down tube 22 and a rear stay 26 extends downwardly from the rear end of the center tube 23. A low level type floor 27 is provided in such a manner as to connect the lower ends of the front and rear stays 25 and 26 to each other.

Figure 2:
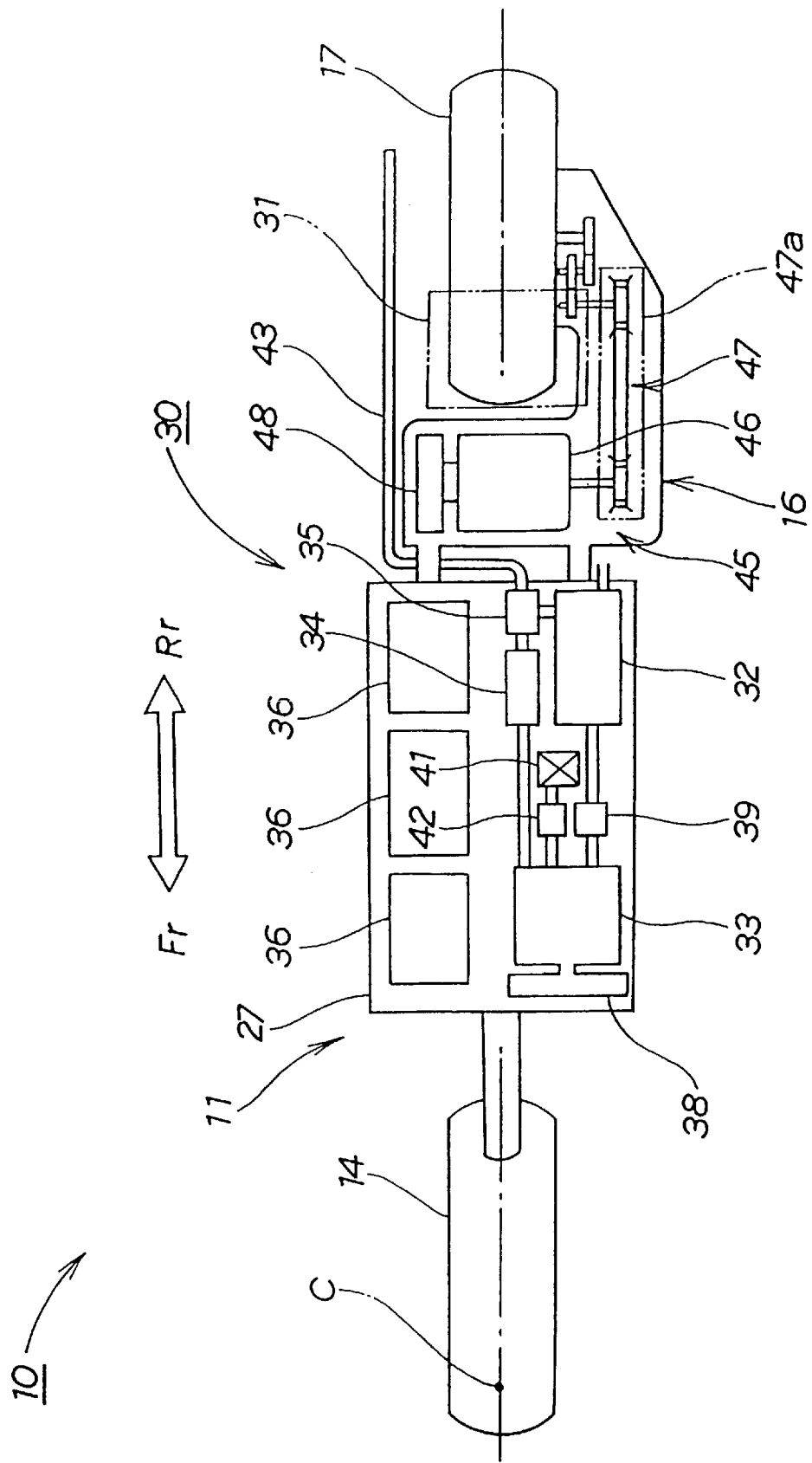
FIG. 2 is a plan diagram showing the layout of a fuel battery system of the fuel battery mounted motorcycle according to the first embodiment of the present invention.

FIG. 2 is a plan diagram showing the layout of the fuel battery system of the fuel battery mounted motorcycle according to the first embodiment of the present invention.

The fuel battery system 30 includes a fuel tank 31 for storing methanol; a reformer 32 for generating hydrogen from methanol supplied from the fuel tank 31 and water; a fuel battery 33 for making hydrogen generated by the reformer 32 electrochemically react with oxygen in air; a catalyzer 34 for receiving water from the fuel battery 33 and carbon dioxide from the reformer 32 via the fuel battery 33 and reducing the amount of carbon dioxide; a water tank 35 for receiving water from the catalyzer 34; and a plurality of secondary batteries 36 for storing an electric power generated by the fuel battery 33 and also storing an electric power generated by the power unit 45. In the figure, character C designates the center plane of a vehicular body of the motorcycle 10.

The fuel battery 33 includes a radiator 38 for cooling the fuel battery 33; a first pump 39 for supplying hydrogen from the reformer 32 to the fuel battery 33; and a second pump 42 for supplying oxygen in air to the fuel battery 33 via an air cleaner 41. The water tank 35 includes an exhaust pipe 43 for discharging water vapor.

The power unit 45 includes a motor 46 driven by the secondary batteries 36 and the fuel battery 33; a belt-type automatic transmission 47 connected to the motor 46; and a control unit 48 for controlling the belt-type automatic transmission 47 and the motor 46. In the figure, reference numeral 47a designates a case of the belt-type automatic transmission 47.

As shown in FIG. 2, the motorcycle 10 including the low level floor 27 is configured such that at least one of the fuel battery 33 and the reformer 32 is disposed in a lower portion of the floor 27. As a result, the center of gravity of the motorcycle 10 can be lowered and the floor 27 is effectively utilized for the purpose other than the original purpose of the floor 27.

The motorcycle 10 is also configured such that the reformer 32 for generating hydrogen is disposed, together with the fuel battery 33, in a lower portion of the floor 27. As a result, the center of gravity of the motorcycle 10 can be further lowered and pipes used for connecting the reformer 32 to the fuel battery 33 can be shortened.

The motorcycle 10 is further configured such that the secondary batteries 36 are disposed, together with the fuel battery 33, in a lower portion of the floor 27. As a result, the center of gravity of the motorcycle 10 can be lowered. That is to say, since the heavy secondary batteries 36 and fuel battery 33 are disposed in the lower portion of the floor 27, the center of gravity of the motorcycle 10 can be further lowered.

The motorcycle 10 is further configured such that the reformer 32 for generating hydrogen is disposed, together with the fuel battery 33 and the secondary batteries 36, in a lower portion of the floor 27. As a result, the center of gravity of the motorcycle 10 can be further lowered and the floor 27 can be effectively utilized for the purpose other than the original purpose of the floor 27. Further, the system using the reformer 32, fuel battery 33, and secondary batteries 36 can be centralized, and wires or pipes for electrically or fluidly connecting the reformer 32, fuel battery 33, and secondary batteries 36 to each other can be shortened.

As shown in FIG. 2, the motorcycle 10 including the fuel battery 33, secondary batteries 36, motor 46, and belt-type automatic transmission 47 according to this embodiment is configured such that the belt-type automatic transmission 47 is disposed on one side with respect to the center plane C of the vehicular body and the secondary batteries 36 is disposed on the other side with respect to the center plane C of the vehicular body. As a result, the weights on the right and left sides of the motorcycle 10 can be kept in balance.

The operation of the above-described fuel battery system 30 will be described below.

Figure 3:
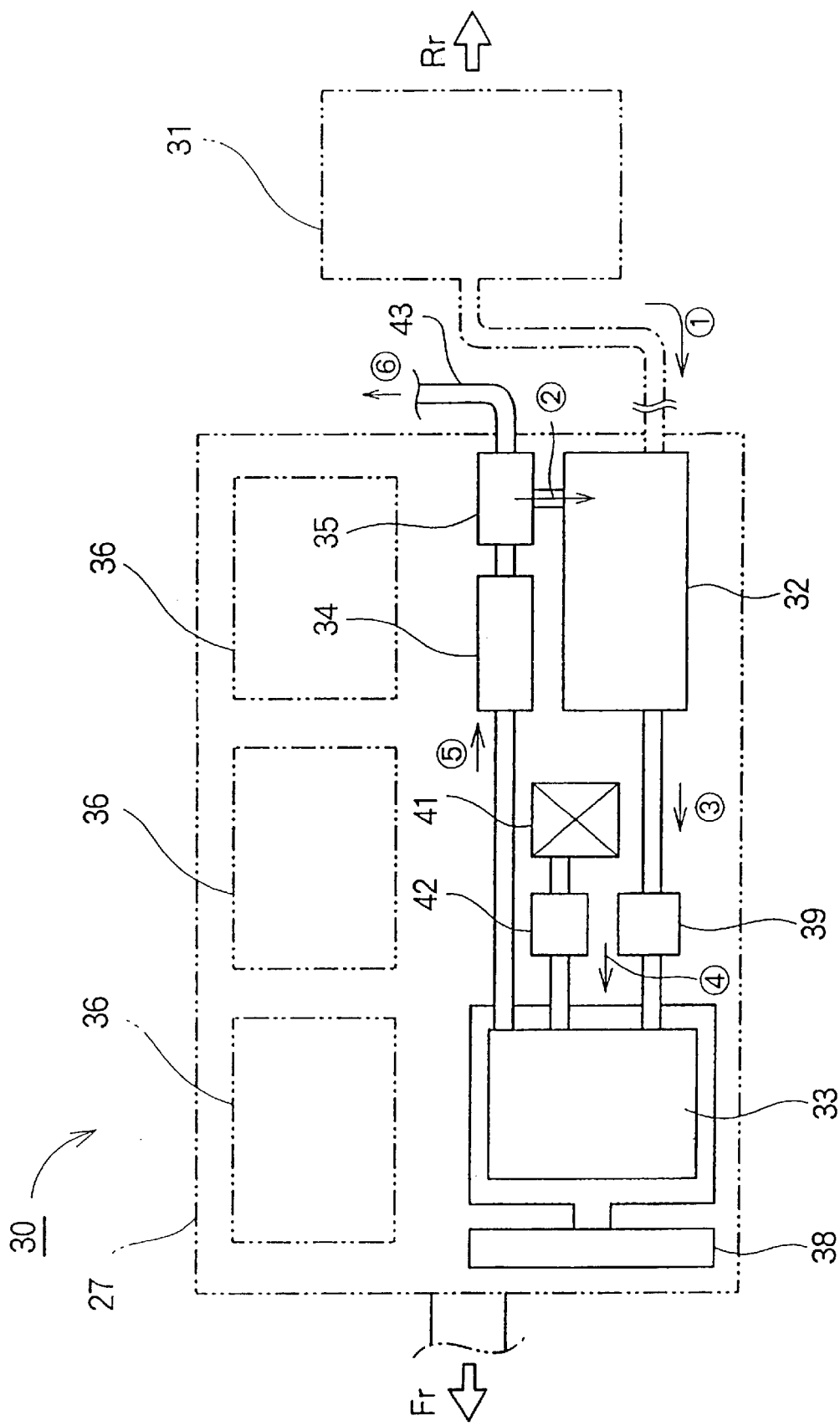
FIG. 3 is a diagram illustrating the operation of the fuel battery system of the fuel battery mounted motorcycle according to the first embodiment of the present invention.

FIG. 3 is a diagram illustrating the operation of the fuel battery system of the fuel battery mounted motorcycle of the present invention. In this figure, methanol, oxygen, hydrogen, and water flow in respective directions shown by arrows (1) to (6).

In the fuel battery system 30, methanol is supplied from the fuel tank 31 to the reformer 32 as shown by the arrow (1). Water is supplied from the water tank 35 to the reformer 32 as shown by the arrow (2). Hydrogen produced by the reforming process in the reformer 32 is supplied to the fuel battery 33 along the direction shown by arrow (3). Oxygen in air is supplied to the fuel battery 33 via the air cleaner 41 as shown by the arrow (4) by the second pump 42, to generate an electric power in the fuel battery 33. Water vapor and carbon dioxide are discharged from the fuel battery 33 to the catalyzer 34 as shown by the arrow (5) to reduce the amount of carbon dioxide, and part of water vapor is discharged to atmospheric air from the exhaust pipe 43 as shown by the arrow (6), and the residue of water vapor is stored in the water tank 35 to be circulated to the reformer 32 as described.

Figure 4:
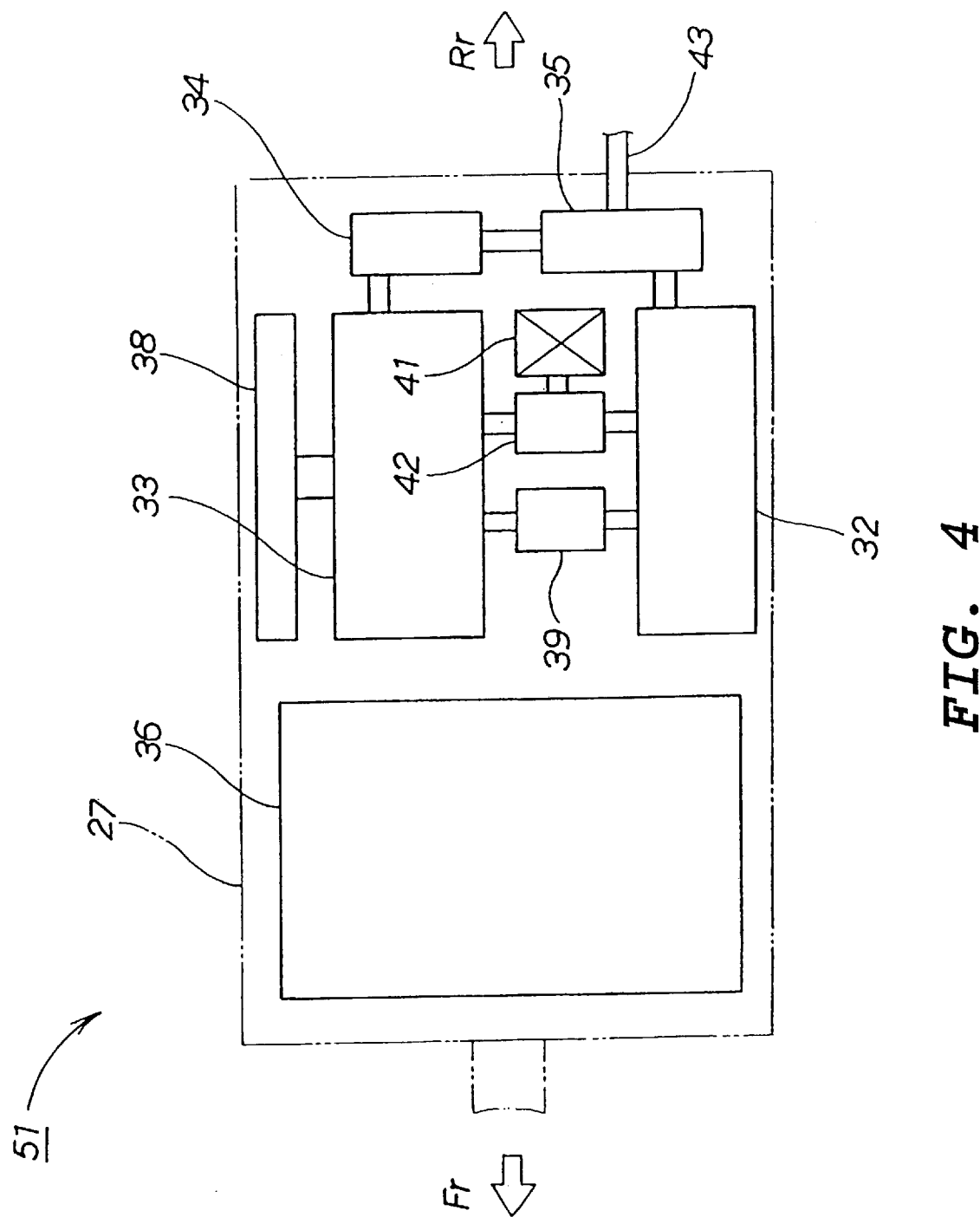
FIG. 4 is a plan diagram showing the layout of a first modification of the fuel battery system of the fuel battery mounted motorcycle according to the first embodiment of the present invention.

FIG. 4 is a plan diagram showing the layout of a first modification of the fuel battery system of the fuel battery mounted motorcycle according to the first embodiment of the present invention. In this figure showing a fuel battery system 51, for the sake of clarity, parts corresponding to those of the above-described fuel battery system 30 are designated by the same reference numerals. That is to say, reference numeral 27 designates a floor; 32 is a reformer; 33 is a fuel battery; 34 is a catalyzer; 35 is a water tank; 36 is a secondary battery; 38 is a radiator; 39 is a first pump; 41 is an air cleaner; 42 is a second pump; and 43 is an exhaust pipe. As shown in this figure, the fuel battery system 51 is configured such that the heavy secondary battery 36 is disposed on the front side of a lower portion of the floor 27.

In the motorcycle 10 (see FIG. 1) having the above-described fuel system 51, since the secondary battery 36 is disposed on the front side of the lower portion of the floor 27 and the fuel battery 33 is disposed on the rear side of the lower portion of the floor 27, it is possible to easily perform maintenance of the secondary battery 36, and to increase a load distributed on the front wheel 14 (see FIG. 1) of the motorcycle 10 and thereby keep the weight of the front wheel 14 in balance against the weight of the rear wheel 17.

Figure 5:
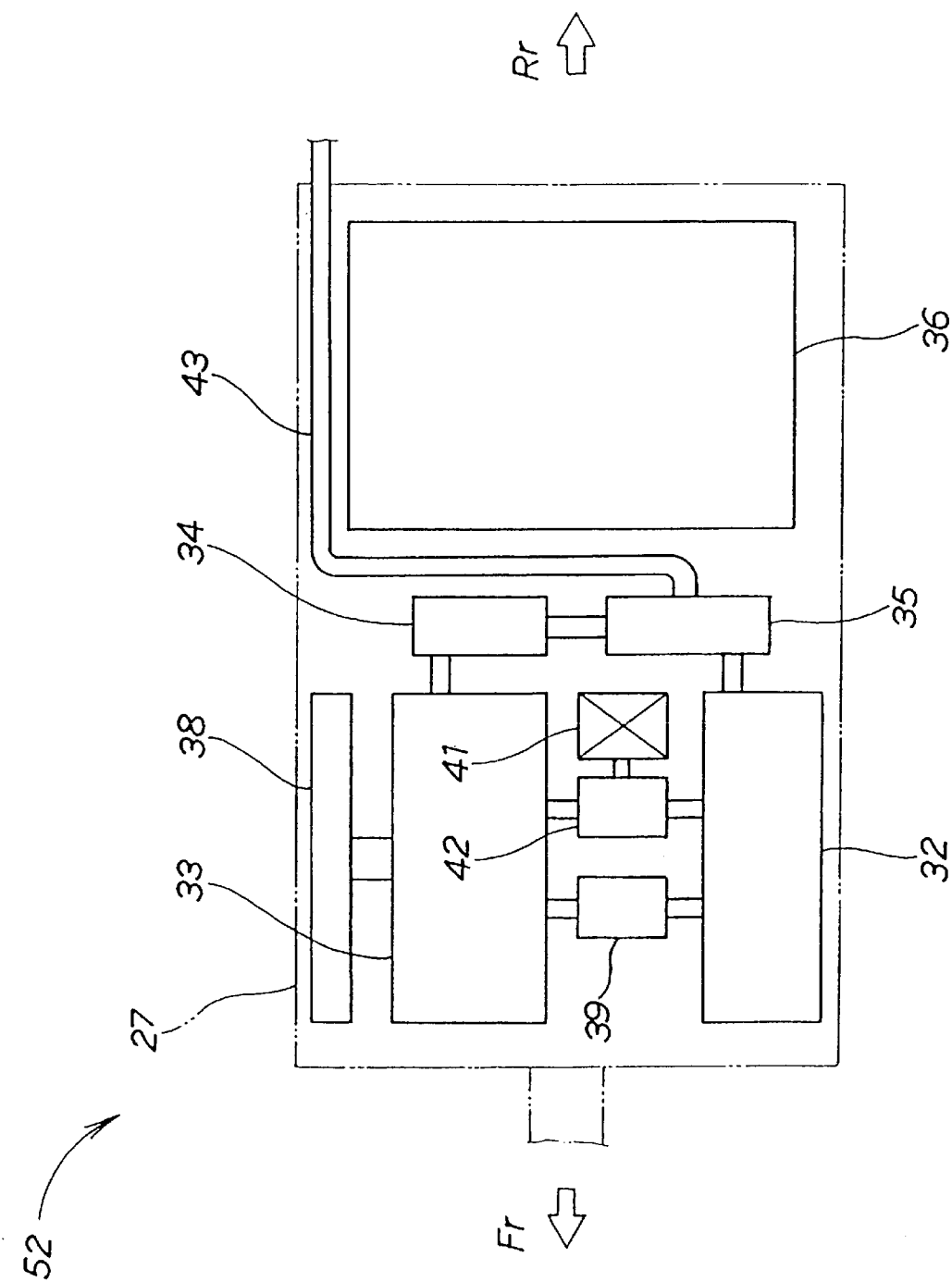
FIG. 5 is a plan diagram showing the layout of a second modification of the fuel battery system of the fuel battery mounted motorcycle according to the first embodiment of the present invention.

FIG. 5 is a plan diagram showing the layout of a second modification of the fuel battery system of the fuel battery mounted motorcycle according to the first embodiment of the present invention. In this figure showing a fuel battery system 52, for the sake of clarity, parts corresponding to those of the above-described fuel battery system 30 are designated by the same reference numerals. That is to say, reference numeral 27 designates a floor; 32 is a reformer; 33 is a fuel battery; 34 is a catalyzer; 35 is a water tank; 36 is a secondary battery; 38 is a radiator; 39 is a first pump; 41 is an air cleaner; 42 is a second pump; and 43 is an exhaust pipe. As shown in this figure, the fuel battery system 52 is configured such that the heavy secondary battery 36 is disposed on the rear side of a lower portion of the floor 27. As a result, it is possible to improve the effect of cooling the reformer 32 and the fuel battery 33.

Figure 6:
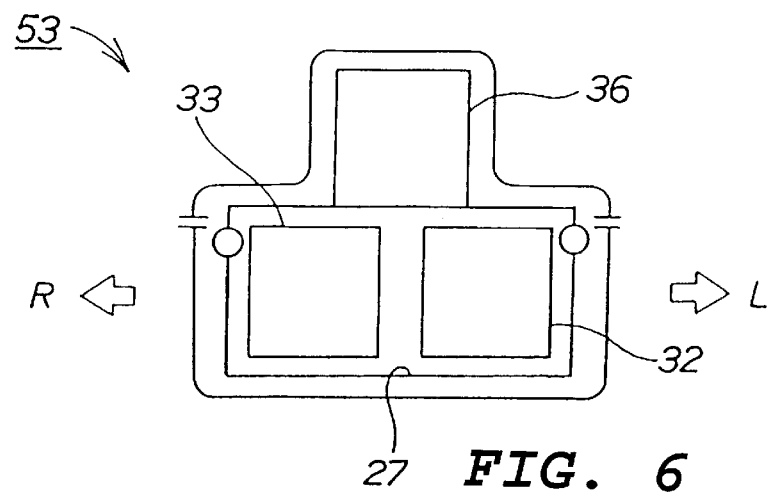
FIG. 6 is a front diagram showing the layout of a third modification of the fuel battery system of the fuel battery mounted motorcycle according to the first embodiment of the present invention.

FIG. 6 is a front diagram showing the layout of a third modification of the fuel battery system of the fuel battery mounted motorcycle according to the first embodiment of the present invention. In this figure showing a fuel battery system 53, for the sake of clarity, parts corresponding to those of the above-described fuel battery system 30 are designated by the same reference numerals. That is to say, reference numeral 27 designates a floor; 32 is a reformer; 33 is a fuel battery; and 36 is a secondary battery. As shown in this figure, the fuel battery system 53 is configured such that the fuel battery 33 and the reformer 32 are disposed in a lower portion of the floor 27 and the secondary battery 36 is disposed on the fuel battery 33 and the reformer 32.

In the motorcycle 10 (see FIG. 1) including the above fuel system 53, since the secondary battery 36 and the fuel battery 33 are stacked on each other in the vertical direction, it is possible to easily change the capacity of the secondary battery 36.

Figure 7:
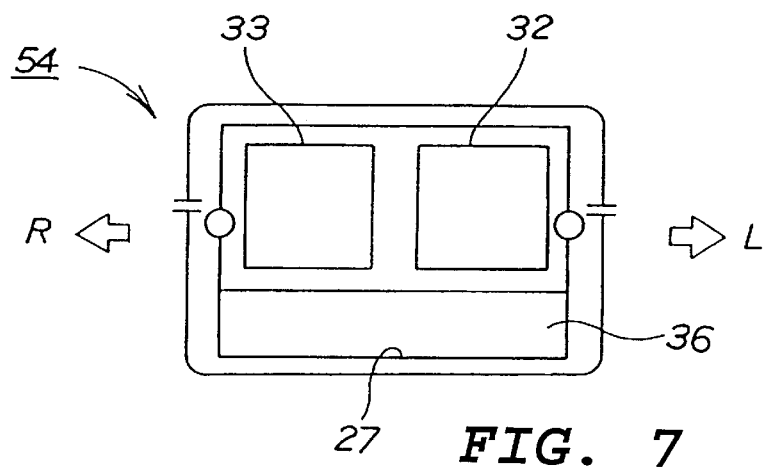
FIG. 7 is a front diagram showing the layout of a fourth modification of the fuel battery system of the fuel battery mounted motorcycle according to the first embodiment of the present invention.

FIG. 7 is a front diagram showing the layout of a fourth modification of the fuel battery system of the fuel battery mounted motorcycle according to the first embodiment of the present invention. In this figure showing a fuel battery system 54, for the sake of clarity, parts corresponding to those of the above-described fuel battery system 30 are designated by the same reference numerals. That is to say, reference numeral 27 designates a floor; 32 is a reformer; 33 is a fuel battery; and 36 is a secondary battery. As shown in this figure, the fuel battery system 54 is configured such that the secondary battery 36 is disposed in a lower portion of the floor 27 and the fuel battery 33 and the reformer 32 are disposed on the secondary battery 36.

In the motorcycle 10 (see FIG. 1) including the fuel system 54, since the secondary battery 36 and the fuel battery 33 are stacked on each other in the vertical direction, it is possible to lower the center of gravity of the motorcycle 10 by disposing the secondary battery 36 under the fuel battery 33.

Figure 8:
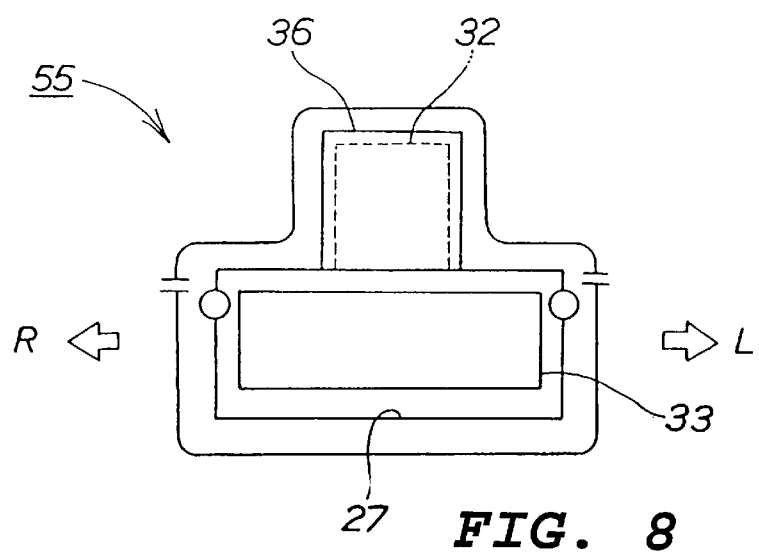
FIG. 8 is a front diagram showing the layout of a fifth modification of the fuel battery system of the fuel battery mounted motorcycle according to the first embodiment of the present invention.

FIG. 8 is a front diagram showing the layout of a fifth modification of the fuel battery system of the fuel battery mounted motorcycle according to the first embodiment of the present invention. In this figure showing a fuel battery system 55, for the sake of clarity, parts corresponding to those of the above-described fuel battery system 30 are designated by the same reference numerals. That is to say, reference numeral 27 designates a floor; 32 is a reformer; 33 is a fuel battery; and 36 is a secondary battery. As shown in this figure, the fuel battery system 55 is configured such that the fuel battery 33 is disposed in a lower portion of the floor 27, and the secondary battery 36 and the reformer 32 are disposed on the fuel battery 33 in such a manner as to be located on the front and rear sides, respectively. As a result, it is possible to easily perform maintenance of the secondary battery 36 and the reformer 32.

Figure 9:
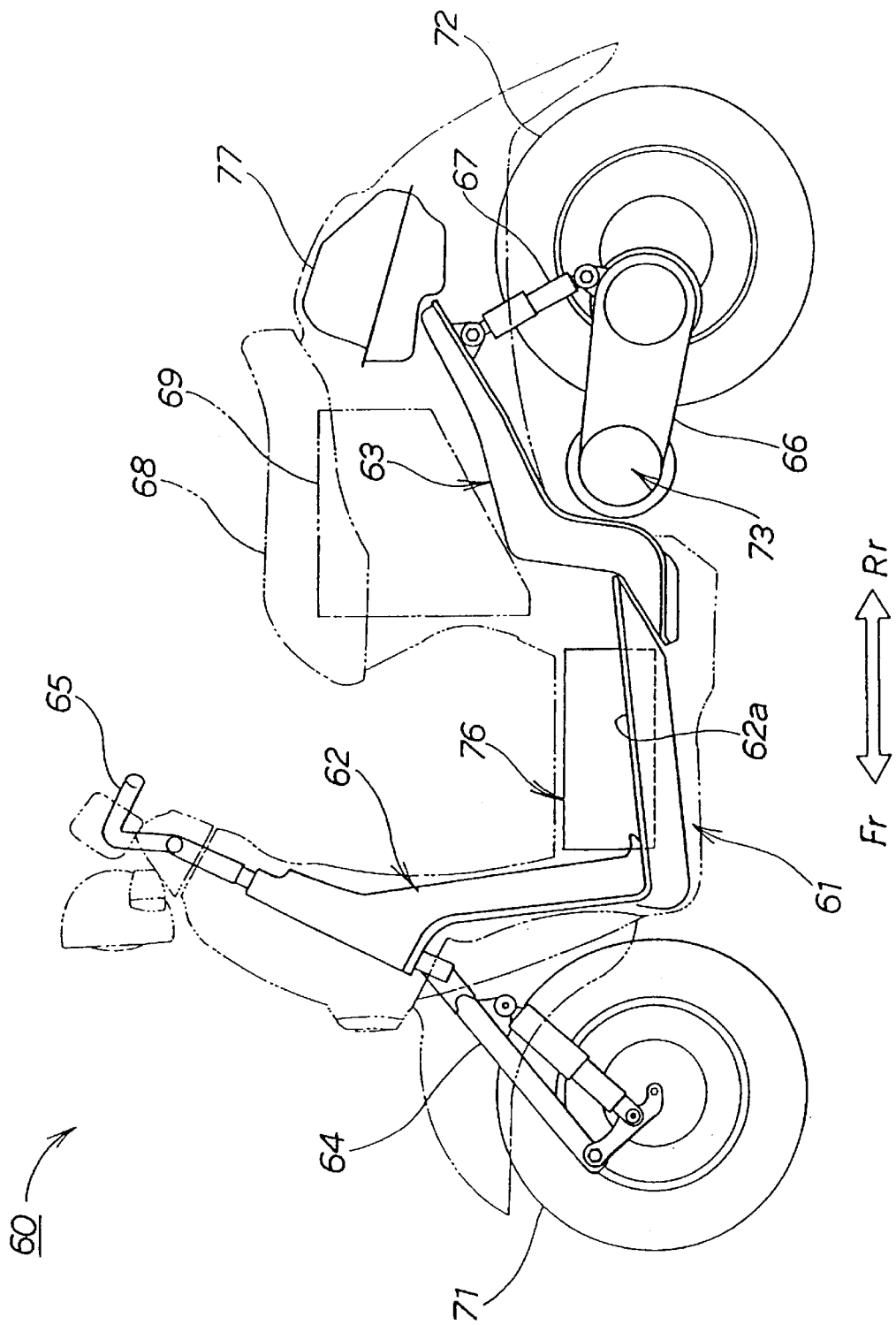
FIG. 9 is a side view of a second embodiment of the fuel battery mounted motorcycle according to the present invention.

FIG. 9 is a side view of a second embodiment of the fuel battery mounted motorcycle according to the present invention. In this figure, reference numeral 61 designates a body frame; 62 is a front frame made from aluminum by die-casting, which constitutes part of the body frame 61; 63 is a rear frame made from aluminum by die-casting, which constitutes part of the body frame 61; 64 is a front suspension; 65 is a handlebar; 66 is a swing unit; 67 is a rear suspension; 68 is a seat; 69 is a helmet box; 71 is a front wheel; 72 is a rear wheel; and 73 is a drive unit composed of a transmission and a motor. As shown in this figure, a fuel battery mounted motorcycle 60 (hereinafter, referred to as "motorcycle 60") is configured such that a power generation unit 76 mainly including a fuel battery, a reformer, and a secondary battery is mounted in a lower portion of a floor 62a of the die-cast front frame 62, and a fuel tank 77 for storing methanol is mounted to the die-cast rear frame 63.

In the motorcycle 60, the body frame 62 is divided into the die-cast front frame 62 and the die-cast rear frame 63, and the respective components are mounted to the frames 62 and 63. As a result, it is possible to easily assemble the motorcycle 60 and hence to reduce the assembling cost.

Figure 10:
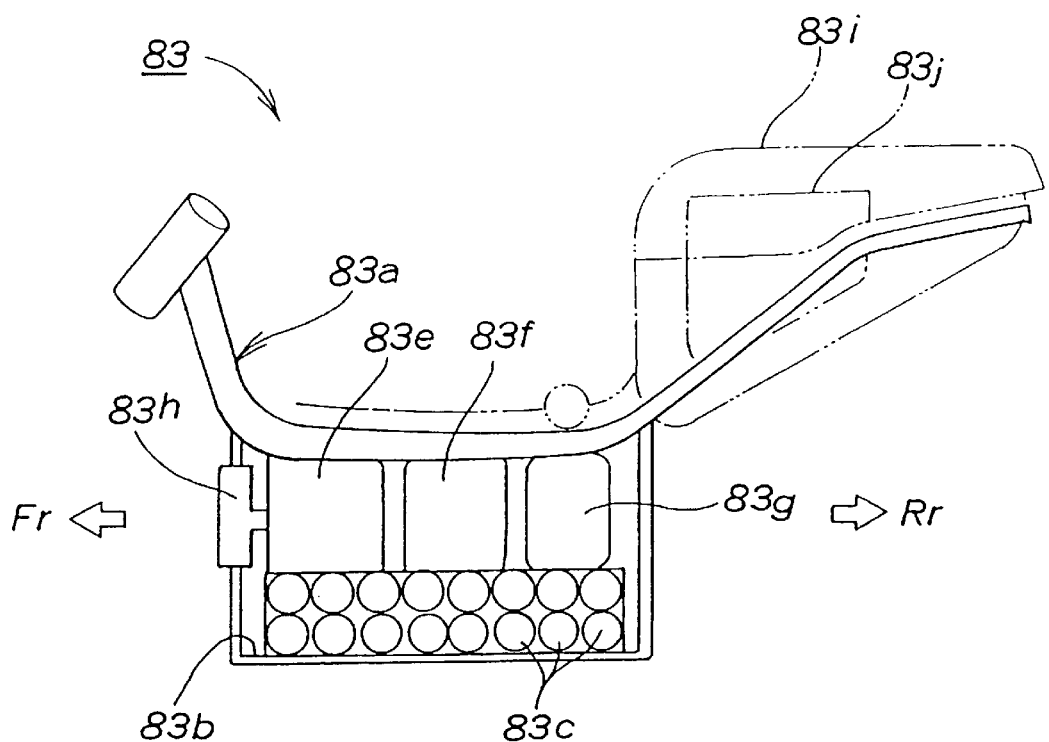
FIG. 10 is a side view of a third embodiment of the fuel battery mounted motorcycle according to the present invention.

FIG. 10 is a side view of a third embodiment of the fuel battery mounted motorcycle according to the present invention. A fuel battery mounted motorcycle 83 (hereinafter, referred to as "motorcycle 83") is configured such that a plurality of secondary batteries 83c are disposed in a lower portion of a floor 83b of a body frame 83a, and a fuel battery 83e, a reformer 83f for generating hydrogen, and a fuel tank 83g for storing methanol are disposed on the secondary batteries 83c in this order from the front side. In this figure, reference numeral 83h designates a radiator provided on the fuel battery 83e; 83i is a seat; and 83j is a helmet box. With this configuration, since the secondary batteries 83c and the fuel battery 83e are disposed in the lower portion of the floor 83b of the body frame 83a, it is possible to lower the center of gravity of the motorcycle 83.

Figure 11:
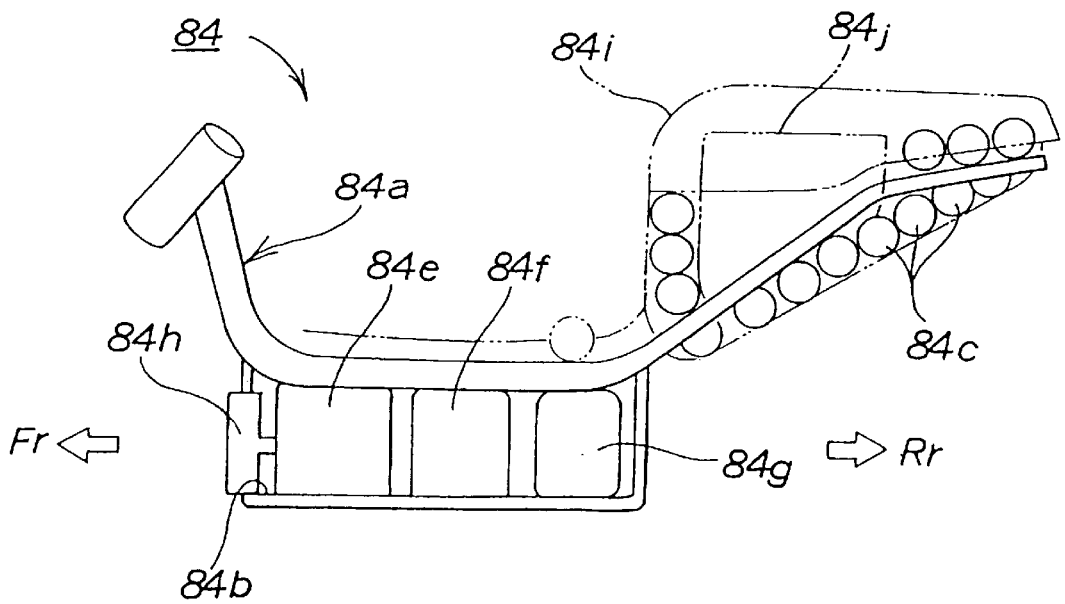
FIG. 11 is a side view of a fourth embodiment of the fuel battery mounted motorcycle according to the present invention.

FIG. 11 is a side view of a fourth embodiment of the fuel battery mounted motorcycle according to the present invention. A fuel battery mounted motorcycle 84 (hereinafter, referred to as "motorcycle 84") is configured such that a fuel battery 84e, a reformer 84f, and a fuel tank 84g are disposed in a lower portion of the floor 84b of a body frame 84a, and a plurality of secondary batteries 84c are disposed on a rear portion of the body frame 84a. In this figure, reference numeral 84h designates a radiator provided on the fuel battery 84e; 84i is a seat; and 84j is a helmet box. With this configuration, since the secondary batteries 84c are disposed on the rear portion of the body frame 84a, it is possible to enlarge an inner space of the floor 84b of the motorcycle 84.

Figure 12:
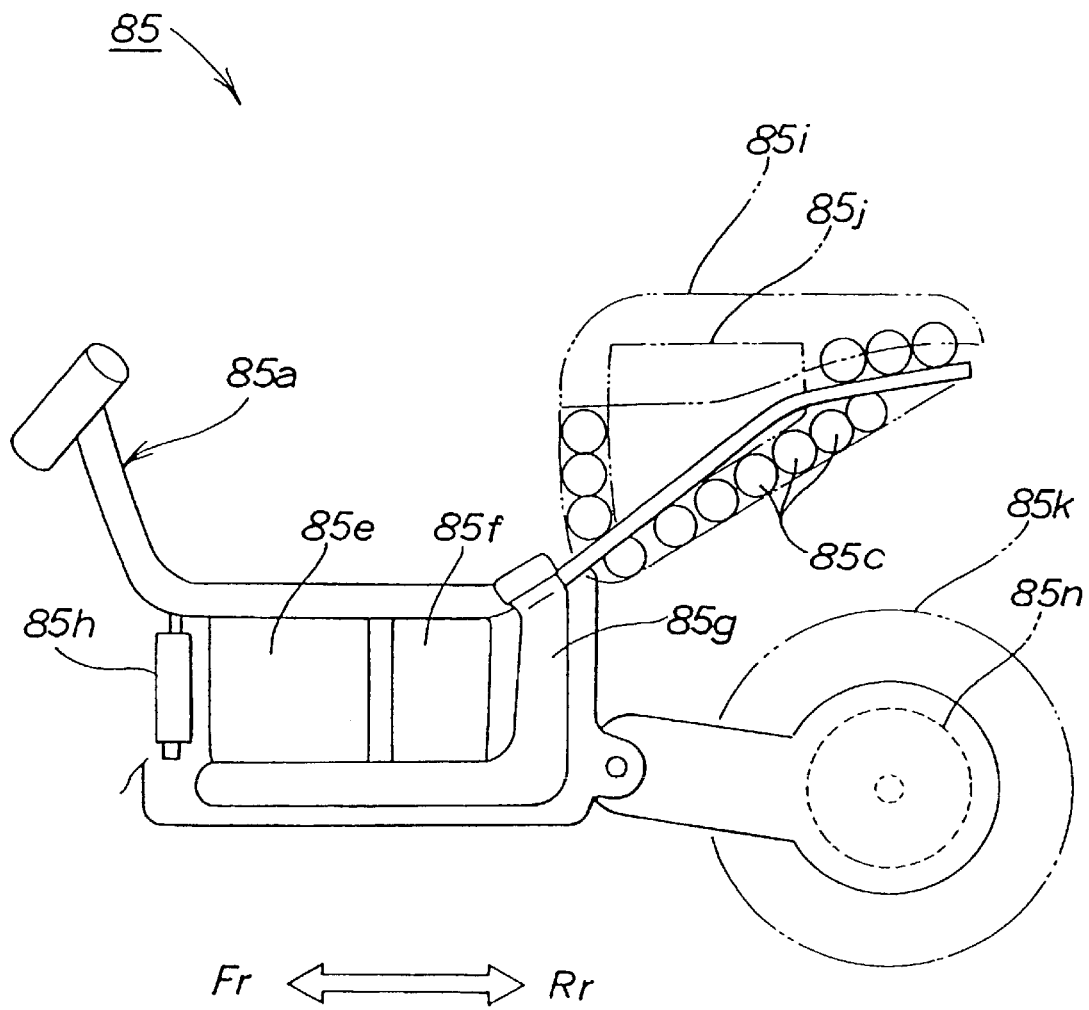
FIG. 12 is a side view of a fifth embodiment of the fuel battery mounted motorcycle according to the present invention.

FIG. 12 is a side view of a fifth embodiment of the fuel battery mounted motorcycle according to the present invention. A fuel battery mounted motorcycle 85 (hereinafter, referred to as "motorcycle 85") is configured such that a fuel battery 85e, a reformer 85f, and an L-shaped fuel tank 85g are disposed in a lower portion of a floor 85b of a body frame 85a, and a plurality of secondary batteries 85c are disposed on a rear portion of the body frame 85a. In this figure, reference numeral 85h designates a radiator provided on the fuel battery 85e; 85i is a seat; and 85j is a helmet box. In addition, the motorcycle 85 is intended to directly drive a rear wheel 85k by a motor 85n with a transmission.

With this configuration, since the L-shaped fuel tank 85g is disposed in the lower portion of the floor 85b of the body frame 85a, it is possible to easily supply fuel to the motorcycle 85.

Figure 13:
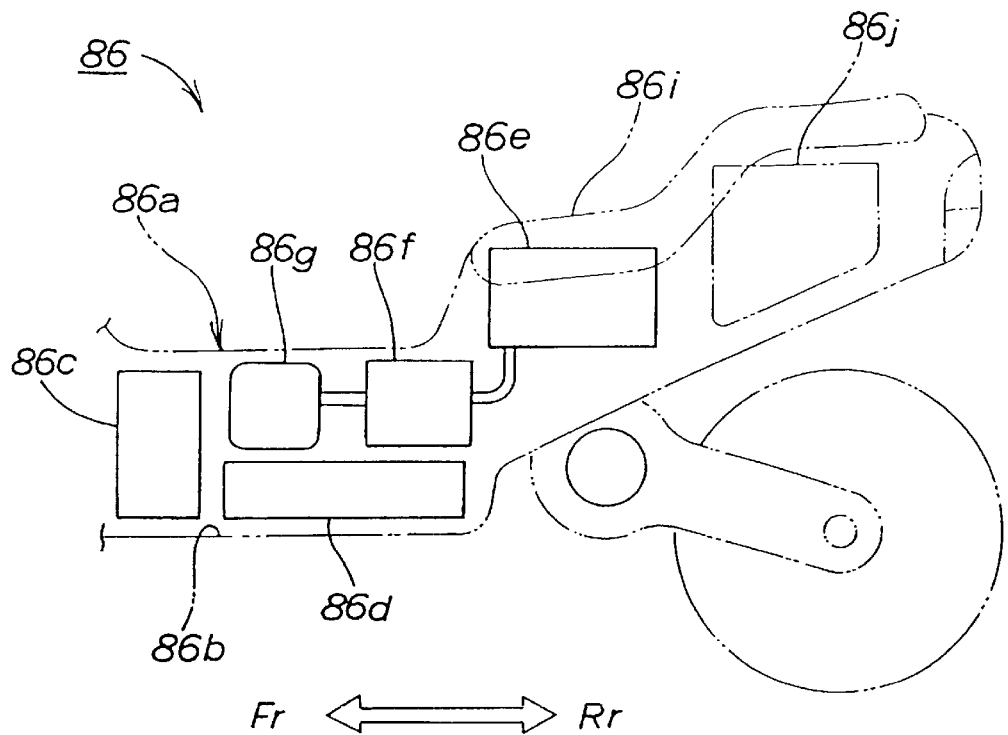
FIG. 13 is a side view of a sixth embodiment of the fuel battery mounted motorcycle according to the present invention.

FIG. 13 is a side view of a sixth embodiment of the fuel battery mounted motorcycle according to the present invention. A fuel battery mounted motorcycle 86 (hereinafter, referred to as "motorcycle 86") is configured such that a fuel battery 86e is disposed under a front portion of a seat 86i, and secondary batteries 86c and 86d, a fuel tank 86g for storing methanol, and a reformer 86f for generating hydrogen are disposed in a lower portion of a floor 86b of a body frame 86a. This layout is suitable for a large-sized scooter type motorcycle. In the figure, reference numeral 86j designates a helmet box.

According to the motorcycle 86, since the fuel battery 86e is disposed under the front portion of the seat 86i, it is possible to enlarge an inner space of the floor 86b.

Figure 14:
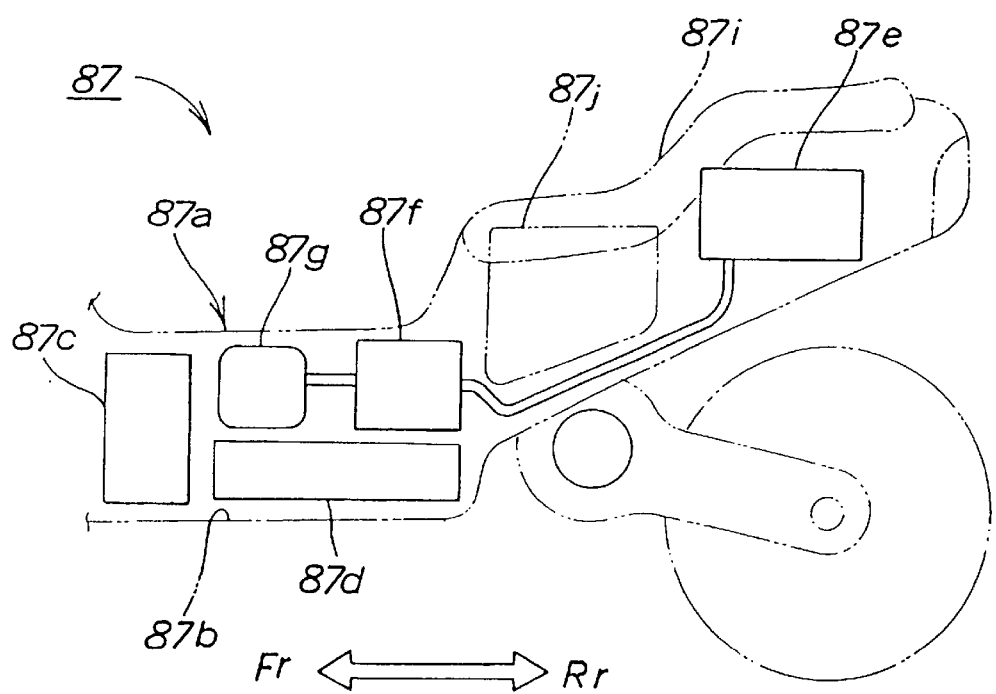
FIG. 14 is a side view of a seventh embodiment of the fuel battery mounted motorcycle according to the present invention.
Figure 15A:
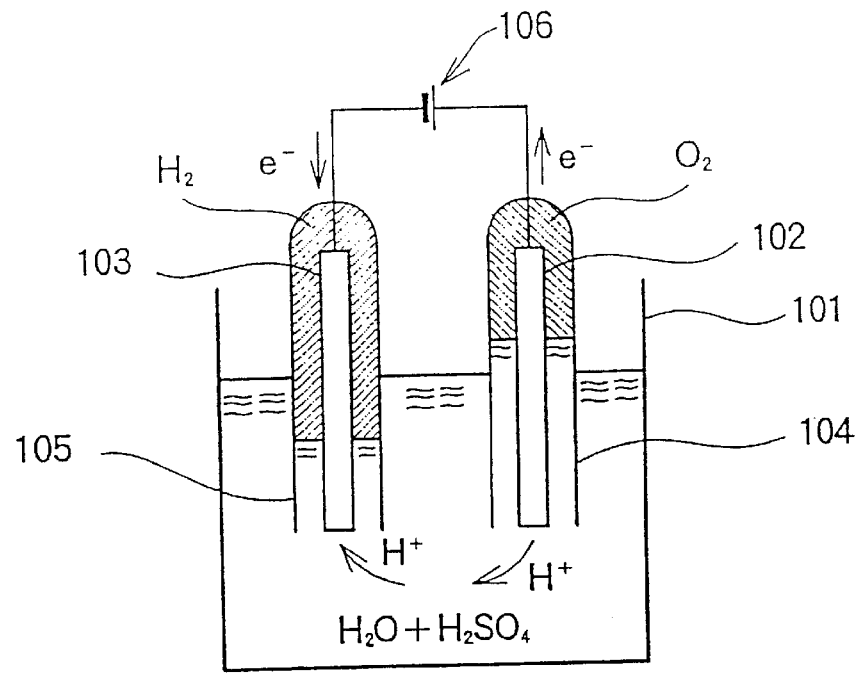
FIGS. 15(a) and 15(b) are diagrams illustrating the power generation principle of a fuel battery.
Figure 15B:
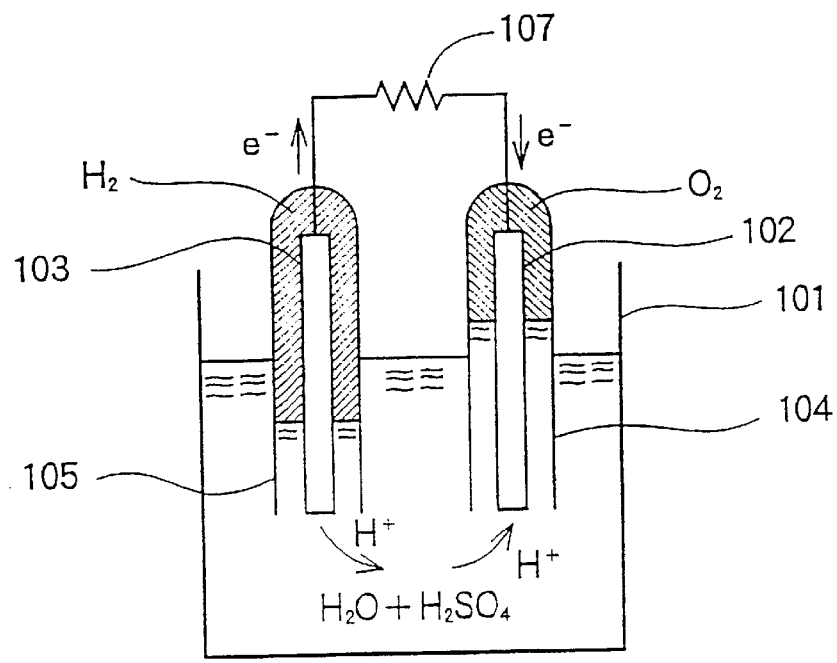
Figure 16:
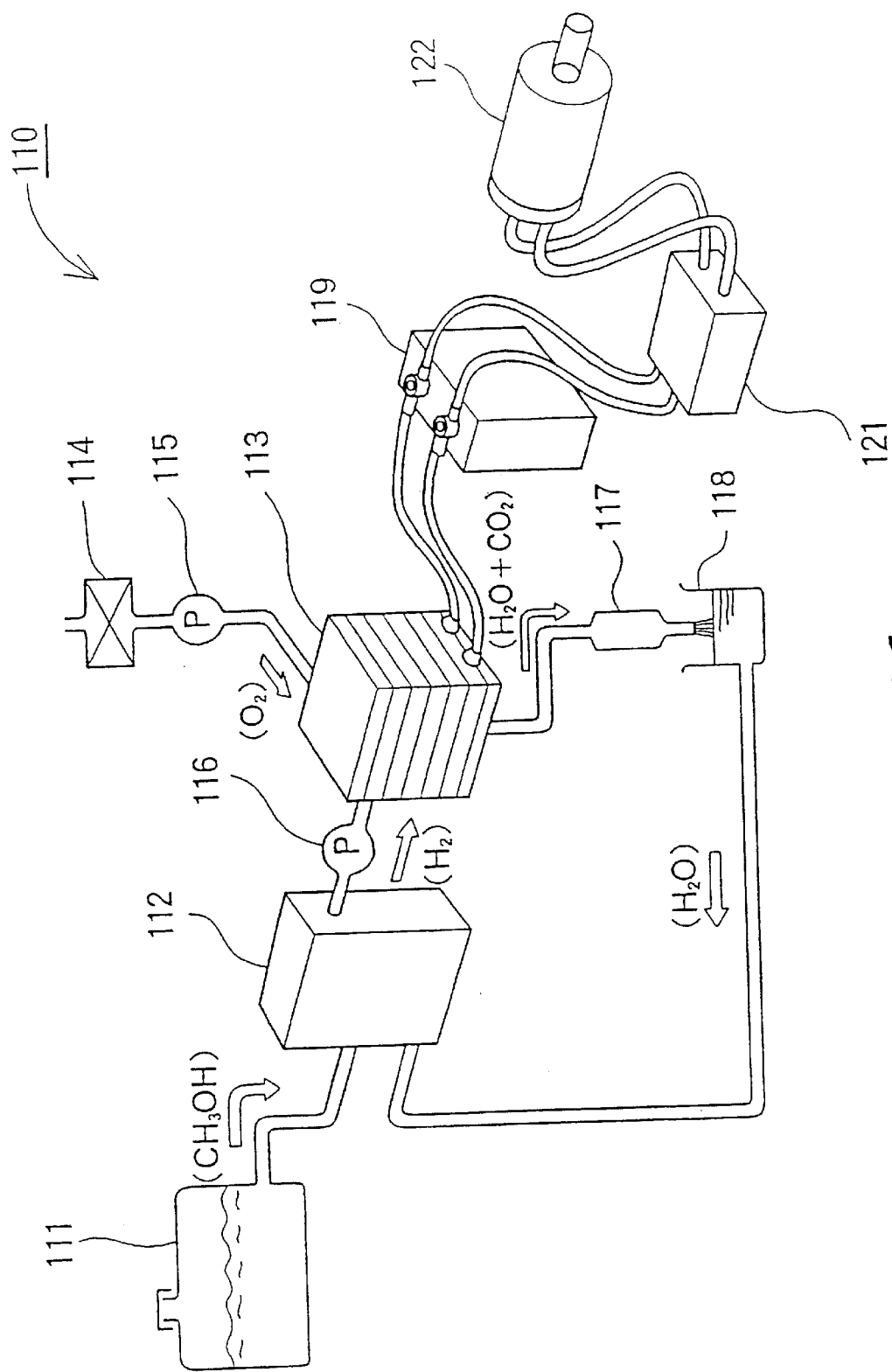
FIG. 16 is a block diagram showing one example of a fuel battery system.

FIG. 14 is a side view of a seventh embodiment of the fuel battery mounted motorcycle according to the present invention. In this figure, reference numeral 87a designates a body frame; 87b is a floor; 87c and 87d are secondary batteries, 87g is a fuel tank; 87f is a reformer, and 87j is a helmet box. A fuel battery mounted motorcycle 87 (hereinafter, referred to as "motorcycle 87") is configured such that the fuel battery 87e is disposed under a rear portion of the seat 87i.

According to the motorcycle 87, since the fuel battery 87e is disposed under the rear portion of the seat 87i, it is possible to enlarge an inner space of the floor 87b.

According to the first embodiment, the fuel tank 31 is provided on the body frame 11 as shown in FIG. 1; however, the present invention is not limited thereto. For example, the fuel tank 31 may be provided, together with the fuel battery 33, reformer 32, and secondary batteries 36 (see FIG. 2), in the lower portion of the floor 27.

Further, according to the first embodiment, the secondary battery 36 is disposed on the front side and the reformer 32 is disposed on the rear side; however, the present invention is not limited thereto but may be configured such that the secondary battery 36 be disposed on the rear side and the reformer 32 is disposed on the front side.

The present invention having the above-described configuration exhibits the following effects:

In the motorcycle according to the present invention including the low level floor, since at least one of a fuel battery and a reformer for generating hydrogen is disposed in a lower portion of the floor, it is possible to lower the center of gravity of the motorcycle, and hence to make effective use of the floor while lowering the center of gravity of the motorcycle.

In the motorcycle according to the present invention, since the reformer for generating hydrogen may be disposed, together with the fuel battery, in the lower portion of the floor, it is possible to further lower the center of gravity of the motorcycle, and also to shorten pipes for connecting the fuel battery to the reformer.

In the motorcycle according to the present invention, since the secondary battery may be disposed, together with the fuel battery, in the lower portion of the floor, it is possible to lower the center of gravity of the motorcycle. That is to say, since the heavy secondary battery and fuel battery are disposed in the lower portion of the floor, it is possible to further lower the center of gravity of the motorcycle.

In the motorcycle according to the present invention, since the secondary battery may be located on the front side of the lower portion of the floor and the fuel battery is disposed on the rear side of the lower portion of the floor, it is possible to increase a load distributed on a front wheel and thereby keep the weight of the front wheel in balance against the weight of a rear wheel, and to improve the maintenance workability of the secondary battery.

In the motorcycle according to the present invention, the secondary battery and the fuel battery may be stacked in the vertical direction in the lower portion of the floor. With this configuration, it is possible to easily change the capacity of the secondary battery by disposing the secondary battery on the fuel battery, and to lower the center of gravity of the motorcycle by disposing the secondary battery under the fuel battery.

In the motorcycle according to the present invention, since the reformer for generating hydrogen may be disposed, together with the fuel battery and secondary battery, in the lower portion of the floor, it is possible to lower the center of gravity of the motorcycle, to centralize the system including the reformer, fuel battery, and secondary battery, and to shorten wires or pipes for electrically or fluidly connecting them to each other.

In the motorcycle including the fuel battery, secondary battery, motor, and belt-type automatic transmission according to the present invention, since the belt type automatic transmission is disposed on one side with respect to a center plane of a vehicular body of the motorcycle, and the secondary battery is disposed on the other side with respect to the center plane of the vehicular body, it is possible to keep the weights on the right and left sides of the motorcycle in balance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel battery mounted motorcycle comprising:
   a low level floor;
   a fuel battery;
   a secondary battery; and
   a radiator,
   wherein said fuel battery, said secondary battery, and said radiator are disposed in a lower portion of said floor, said fuel battery and said radiator being disposed on one side with respect to a center plane of a vehicle body of the motorcycle, and said secondary batten being disposed on an opposite side with respect to a center line of the vehicle body.

2. The fuel battery mounted motorcycle according to claim 1, further comprising a reformer disposed in said lower portion of said floor.

3. The fuel battery mounted motorcycle according to claim 2, wherein hydrogen is pumped from the reformer into a rear side of said fuel battery by a first pump, and water and carbon dioxide are discharged from said rear side of said fuel battery into a catalyzer.

4. A fuel battery mounted motorcycle comprising:
   a low level floor;
   a fuel battery;
   a secondary battery;
   a radiator; and
   an automatic transmission,
   wherein said fuel battery, said secondary battery, and said radiator are disposed in a lower portion of said floor, said secondary battery being disposed on one side with respect to a center plane of a vehicle body of said motorcycle, and said fuel battery, said radiator, and said automatic transmission being disposed on an opposite side with respect to said center plane of the vehicle body.

5. The fuel battery mounted motorcycle according to claim 4, further comprising a reformer disposed on said opposite side with respect to said center plane of the vehicle body.

6. The fuel battery mounted motorcycle according to claim 4, further comprising a reformer disposed in a lower portion of said floor.

7. The fuel battery mounted motorcycle according to claim 6, wherein a first pump for pumping hydrogen into said fuel battery is disposed behind said fuel battery and said reformer for generating said hydrogen is disposed behind said first pump.

* * * * *